(12) United States Patent
Lee et al.

(10) Patent No.: US 8,761,227 B2
(45) Date of Patent: Jun. 24, 2014

(54) APPARATUS AND METHOD FOR AVOIDING INTERFERENCE NOISE IN FHSS SYSTEM

(75) Inventors: Yong Hwan Lee, Seoul (KR); Seung Hwan Lee, Anyang (KR)

(73) Assignee: SNU R & DB Foundation, Seoul (KR)

( * ) Notice: Subject to any disclaimer, the term of this patent is extended or adjusted under 35 U.S.C. 154(b) by 287 days.

(21) Appl. No.: 13/126,424

(22) PCT Filed: Oct. 27, 2009

(86) PCT No.: PCT/KR2009/006238
§ 371 (c)(1),
(2), (4) Date: May 26, 2011

(87) PCT Pub. No.: WO2010/050734
PCT Pub. Date: May 6, 2010

(65) Prior Publication Data
US 2011/0261861 A1 Oct. 27, 2011

(30) Foreign Application Priority Data
Oct. 27, 2008 (KR) ........................ 10-2008-0105361

(51) Int. Cl.
*H04B 1/00* (2006.01)
(52) U.S. Cl.
USPC .......................................... 375/132; 375/347
(58) Field of Classification Search
CPC .... H04B 1/7136; H04B 1/7143; H04B 1/713; H04B 1/715; H04B 2001/7154; H04B 2001/7152; H04B 2001/713; H04B 2001/71307; H04B 2001/71315; H04B 2001/71323; H04B 2201/71338; H04B 2201/71346; H04B 2201/71353; H04B 2201/71361; H04B 2001/71369; H04B 2201/71376

USPC ................................................... 375/132, 347
See application file for complete search history.

(56) References Cited

U.S. PATENT DOCUMENTS 6,643,278 B1 * 11/2003 Panasik et al. ................ 370/330
8,369,844 B2 * 2/2013 Penisoara et al. ............ 455/418
(Continued)

FOREIGN PATENT DOCUMENTS

| KR | 1020000074904 A | 12/2000 |
| KR | 1020050042786 A | 5/2005 |
| KR | 1020060014049 A | 2/2006 |
| KR | 1020070027468 A | 3/2007 |

OTHER PUBLICATIONS

Chek et al. "Design and evaluation of practical coexistence management schemes for Bluetooth and IEEE 802.11b systems", Jun. 2007, Computer Networks 51, pp. 2086-2103.*

*Primary Examiner* — Sophia Vlahos (57) ABSTRACT

The apparatus of the present invention comprises a group classification part for classifying the entire channels of the FHSS system into a certain number of groups according to the channel bandwidth unit of an FS interference signal; an FS interference elimination part for eliminating a group in which an FS interference exists from said certain number of groups based on the packet error rate (PER) of said certain number of groups that have been classified; and an FD interference avoidance part for avoiding interference by transmitting a packet only if an interference signal does not exist by estimating the existence of said FD interference signal based on a time sequence with respect to the channel to be used for the next frequency hopping (FH), when transmitting a signal by utilizing FH using channels wherein said FS interference signal does not exist.

7 Claims, 8 Drawing Sheets

(56) References Cited

U.S. PATENT DOCUMENTS

2003/0186705 A1* 10/2003 Lahav et al. .................. 455/451
2006/0029018 A1* 2/2006 Mizukami et al. ............ 370/328
2006/0133543 A1* 6/2006 Linsky et al. ................. 375/341
2007/0183338 A1* 8/2007 Singh et al. ................... 370/252

* cited by examiner

APPARATUS AND METHOD FOR AVOIDING INTERFERENCE NOISE IN FHSS SYSTEM

TECHNICAL FIELD

The present invention relates to an apparatus and method for avoiding interference noise in a Frequency-Hopping Spread Spectrum (FHSS) system.

BACKGROUND ART

When there are heterogeneous communication systems which share the same band, a Frequency Hopping spread spectrum (FHSS) system can avoid interference using a frequency hopping (hereinafter referred to as "FH") technique at high speed. For example, a Bluetooth system which is a kind of FHSS system reduces the influence of heterogeneous types of interference using a pseudo-random FH method at a speed of 1600 times per second. This FH technique is disadvantageous in that it is very vulnerable to co-channel interference because an FH channel is determined according to the clock and the address value of a transmission unit without regard to radio interference.

An adaptive FH (hereinafter referred to as "AFH") technique proposed in IEEE 802.15 TG2 classifies channels, in which co-channel interference is present, using a channel classification procedure, and determines FH bands based on the results of the classification, thus avoiding co-channel interference. However, such an AFH technique is disadvantageous in that since FH bands are classified on the basis of the channels of an FHSS system, the time required to classify bands increases, thus coping with co-channel interference slowly.

In addition, in the case where FD interference signals causing interference in narrow band channels for a short period of time are present, if channels in which interference occurs are excluded from frequency hopping channels as in the case of the AFH technique, the number of available frequency hopping channels is reduced instead, so that the probability of colliding with another Frequency Dynamic (FD) interference increases, thus deteriorating system performance.

Further, a power control technique has been considered in various types of wireless communication systems such as Bluetooth systems. Such a power control technique is advantageous in that transmission power is adjusted based on the results of the classification of channels, and then both co-channel interference and channel noise can be rapidly mitigated, but it is disadvantageous in that when a larger number of interference sources are present in a relevant wireless communication system, power consumption increases rapidly.

DISCLOSURE

Technical Problem

Accordingly, the present invention has been made keeping in mind the above problems occurring in the prior art, and an object of the present invention is to provide an apparatus and method for avoiding interference noise in an FHSS system, which classify interference noise into Frequency Static (FS) interference and Frequency Dynamic (FD) interference depending on the spectral characteristics of the interference, and sequentially cancel those interference components, thus efficiently avoiding interference noise.

Another object of the present invention is to provide an apparatus and method for avoiding interference noise in an FHSS system, which divide the channels of the FHSS system on the basis of the bandwidths of the channels of FS interference signals, use PER values on the basis of frequency groups that are obtained by division, classify candidate frequency groups that have a possibility of there being FS interference, and detect only channels in which FS interference signals are actually present by using a filtering technique, thus further reducing the time required to avoid FS interference.

A further object of the present invention is to provide an apparatus and method for avoiding interference noise in an FHSS system, which instantaneously estimate whether an FD interference signal is present in a channel to be used for subsequent FH when transmitting signals based on the FH technique of the FHSS system through channels in which FS interference is not present, and then transmit packets only if an FD interference signal is not present, thus avoiding FD interference.

In order to accomplish the above objects, in accordance with an aspect of the present invention, there is provided an apparatus for avoiding interference noise, including a group classification unit for classifying all channels of a Frequency Hopping Spread Spectrum (FHSS) system into a predetermined number of groups based on bandwidths of channels of FS interference signals; a Frequency Static (FS) interference cancellation unit for eliminating a group in which FS interference is present from the predetermined number of groups based on Packet Error Rate (PER) values of the respective groups; and a Frequency Dynamic (FD) interference avoidance unit for instantaneously estimating whether an FD interference signal is present in a channel to be used for subsequent Frequency Hopping (FH) when transmitting packets through channels in which the FS interference signal is not present by using an FH technique, and transmitting the packets only if an FD interference signal is not present, thus avoiding interference.

In accordance with another aspect of the present invention, there is provided a method of avoiding interference noise, including classifying all channels of a Frequency Hopping Spread Spectrum (FHSS) system into a predetermined number of groups; eliminating a group in which FS interference is present from the predetermined number of groups based on Packet Error Rate (PER) values of the respective groups; and instantaneously estimating whether a Frequency Dynamic (FD) interference signal is present in a channel to be used for subsequent Frequency Hopping (FH) when transmitting packets through channels in which the FS interference signal is not present by using an FH technique, and transmitting the packets only if the FD interference signal is not present, thus avoiding the FD interference signal.

DESCRIPTION OF REFERENCE NUMERALS OF PRINCIPAL ELEMENTS IN THE DRAWINGS

1210: group classification unit
1220: FS interference cancellation unit
1230: FD interference avoidance unit

BEST MODE

Hereinafter, an apparatus and method for avoiding interference noise in an FHSS system according to a first embodiment of the present invention will be described in detail with reference to FIGS. 1 to 6. The terms described in the present specification are defined in consideration of functions of the present invention and may vary depending on the intention or usage of a user or an operator. Therefore, the terms should be defined based on the overall content of the present specification.

Figure 1:
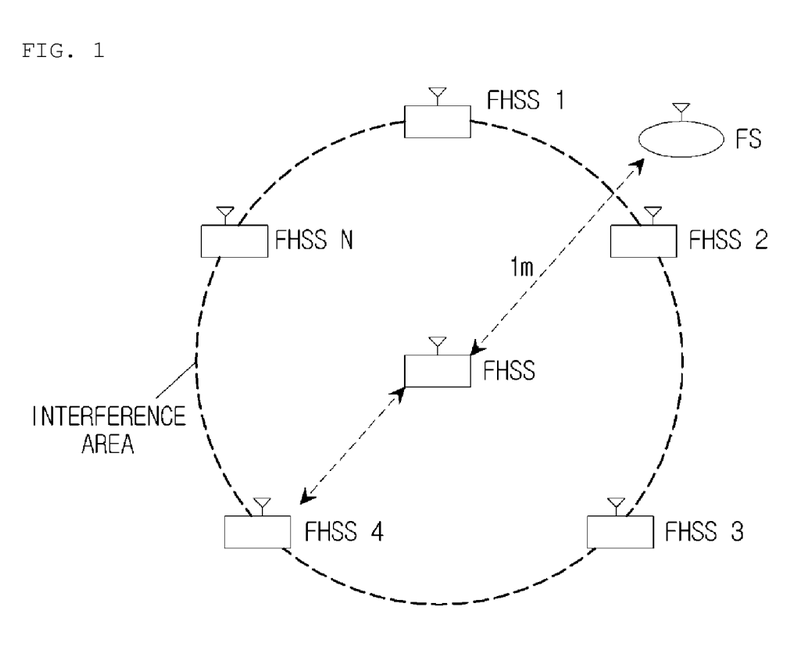
FIG. 1 is a diagram illustrating a performance test model for an FHSS system according to a first embodiment of the present invention.

FIG. 1 is a diagram illustrating a performance test model for an FHSS system according to a first embodiment of the present invention.

As shown in FIG. 1, when heterogeneous communication systems are used in the same frequency band in such a way that an IEEE 802.15.1 Bluetooth system is used as an FHSS system and an IEEE.802.11b Wireless Local Area Network (WLAN) system is used as an adjacent FS interference source, the principal factor that decreases the performance of the FHSS system is that the Signal-to-Interference Ratio (SINR) decreases due to co-channel interference and channel noise.

In order to solve this problem, there is a need to more rapidly and exactly mitigate the influence of co-channel interference and channel noise and to ensure an SINR value required by the FHSS system.

To implement this operation, the present invention deals with a technique for sequentially avoiding FS interference, channel noise, and FD interference in consideration of the spectral characteristics of interference noise components which influence the FHSS system operating in an unlicensed band. That is, the present invention divides FHSS channels on the basis of the bandwidths of the channels of FS interference signals in consideration of the characteristics of the FS interference signals, rapidly avoids FS interference by comparing the Packet Error Rate (PER) values of individual frequency groups with a specific threshold value, performs power control using only channels without having FS interference, compares the PER values of the packets, transmitted through the channels in which FS interference is not present, with a specific threshold value, and adjusts the lengths of the packets to be transmitted or eliminates channels in which FD interference is present from the FH channels on the basis of the results of the comparison, thus sequentially mitigating channel noise and FD interference.

When the total number of channels of the FHSS system according to the present invention is assumed to be M, all sets of those channels can be defined as $\Omega = \{0, 1, \ldots, m, \ldots, M-1\}$. On the basis of the sets, the present invention may primarily avoid the FS interference that exerts the strongest influence on the performance of the FHSS system.

Figure 2:
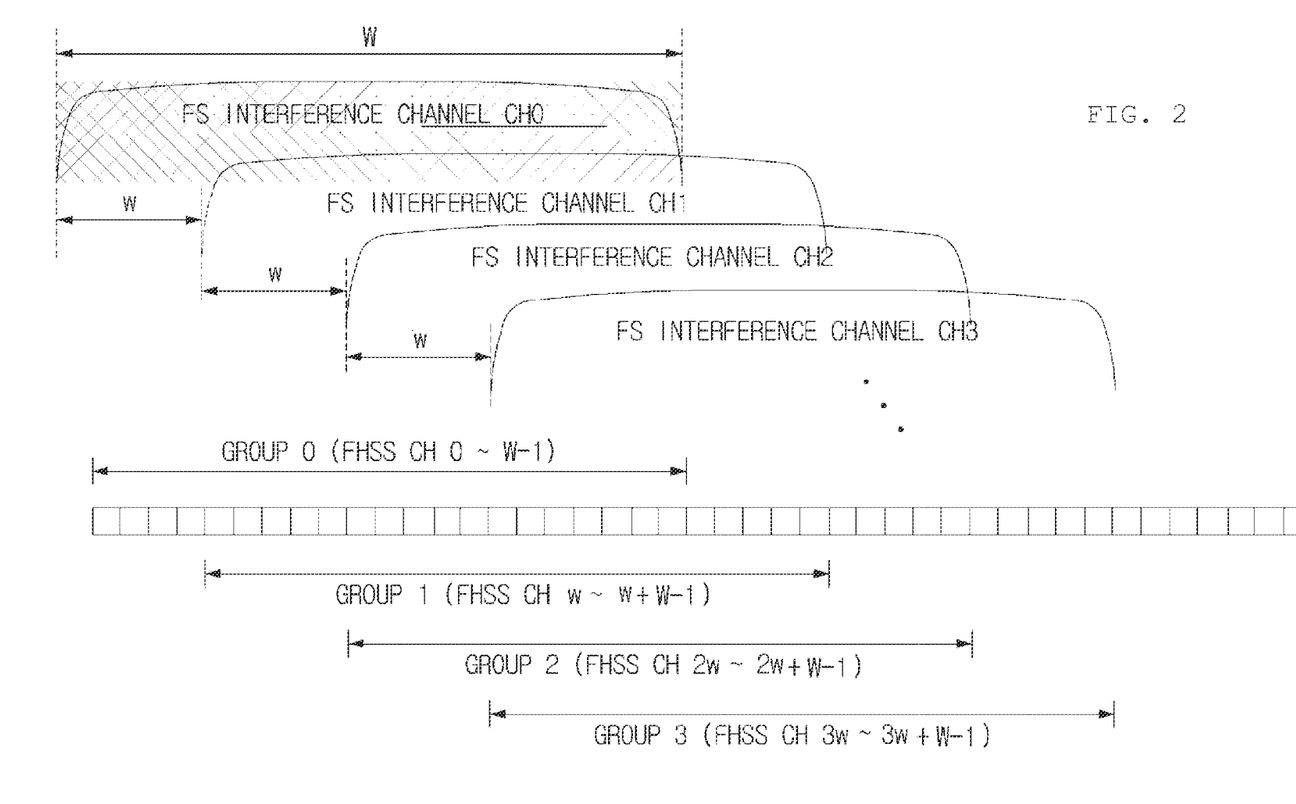
FIG. 2 is a diagram illustrating a procedure for classifying groups according to a first embodiment of the present invention.

FIG. 2 is a diagram illustrating a procedure for classifying groups according to a first embodiment of the present invention.

As shown in FIG. 2, in order to rapidly avoid FS interference channels, the channels of the FHSS system are periodically divided into K groups which correspond to the number of locations and bandwidths of the FS interference signals, that is, $V = \{0, 1, \ldots, k, \ldots, K-1\}$ at preset periods of $T_L$. Group classification can be performed based on the PER values of respective groups.

Figure 3:
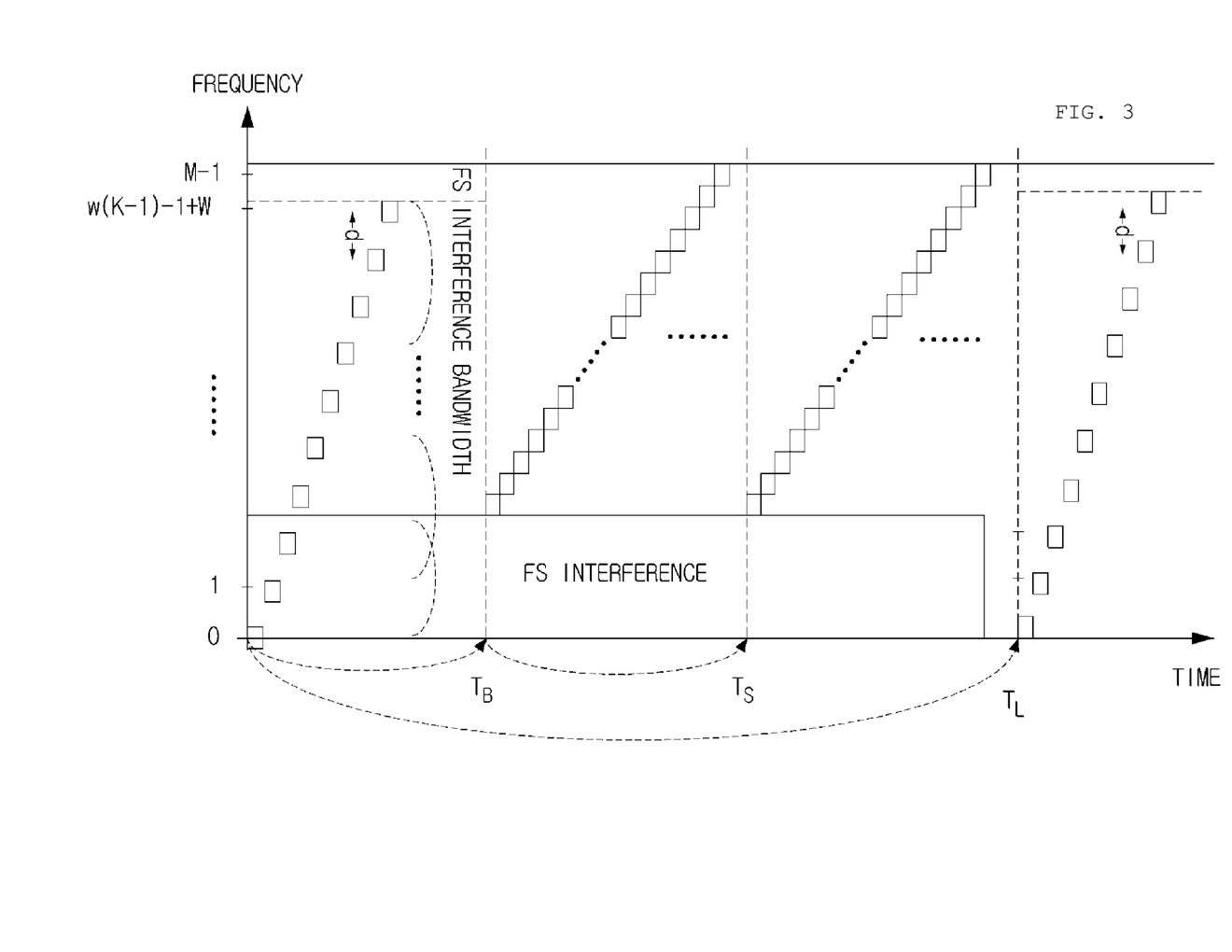
FIG. 3 is a diagram illustrating the schematic construction of an FHSS system according to a first embodiment of the present invention.

FIG. 3 is a diagram illustrating the schematic construction of an FHSS system according to a first embodiment of the present invention.

As shown in FIG. 3, the period during which interference noise is avoided from a total of M channels of the FHSS system is $T_L$, which can be divided into the interval $T_B$ required to cancel FS interference, the interval $T_S$ required to cancel channel noise, and the remaining interval required to cancel FD interference.

When an FS interference channel having a bandwidth of W overlaps adjacent FS interference channels by W−w, a set of the channels of the FHSS system, which are included in a group k, can be represented by the following Equation 1:

$$\Psi_k = \{m \in \Omega | wk \leq m < wk + W\} \qquad \text{[Equation 1]}$$

where W may denote a number of the channels of the FHSS system included in the bandwidth of each FS interference channel, and w may denote a number of the channels of the FHSS system included in the non-overlapping bandwidth between each FS interference channel and its adjacent FS interference channel.

In this case, the FHSS system may define a packet having the shortest time length among the packets of the FHSS system, for example, Data High Rate 1 (DH1) or the like of Bluetooth, as a non-overlapping channel set $\Theta_r^F$, as given by the following Equation 2 and may transmit the defined packet, in order to reduce the time $T_c$ required to classify such groups and minimize FS interference exerted by other FHSS systems, $$\Theta_r^F = \{m \in \Omega | m = r + dq \leq w(K-1) + W\} \qquad \text{[Equation 2]}$$

where r may denote the index of the non-overlapping FH channel set, d may denote the interval between FH channels, and q may denote a q-th FH channel.

In this case, the PER for group k of an FHSS system i can be represented by the following Equation 3.

$$PER_i^{GRP}(k) = \frac{\sum_{j=0}^{W-1} PER_{i,k}(j)}{\lceil (W-r)/d \rceil} \quad \text{[Equation 3]}$$

where ⌈x⌉ may denote the smallest integer equal to or greater than x, and $PER_{i,k}(j)$ may denote the PER of a j-th channel within the group k of the FHSS system i.

The present invention can estimate a set i of groups in which FS interference is present in consideration of the case where FS interference channels overlap one another, and this procedure will be described with reference to FIG. 4.

Figure 4:
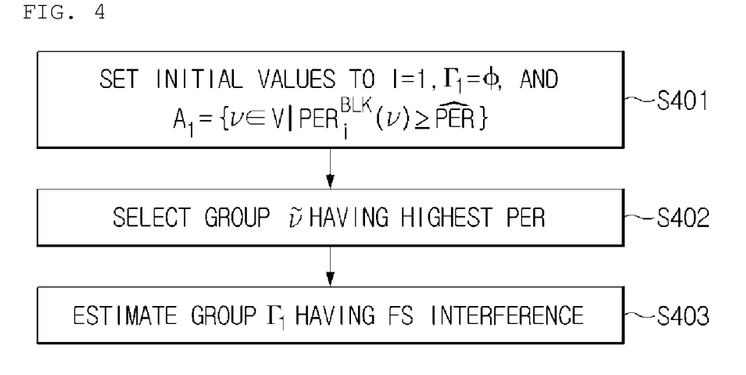
FIG. 4 is a flowchart illustrating a procedure for estimating a group in which FD interference is present according to a first embodiment of the present invention.

FIG. 4 is a flowchart illustrating a procedure for estimating a group in which FS interference is present according to a first embodiment of the present invention.

As shown in FIG. 4, the FHSS system of the present invention can set the initial values of variables to l=1, $\Gamma_i=\phi$, and $\Lambda_l=\{v \in V | PER_i^{BLK}(v) \geq \widehat{PER}\}$ at step S401, where $\widehat{PER}$ may denote the required PER, and $\Lambda_l$ may denote a set of groups having mean PER values which are greater than $\widehat{PER}$.

When the initial values are set, the group having the highest PER can be selected from among the groups of $\Lambda_l$ on the basis of the initial values at step S402, and this operation can be represented by the following Equation 4:

$$\tilde{v} = \arg\max_{v \in \Lambda_l} PER_i^{GRP}(v) \quad \text{[Equation 4]}$$

The PER of the group $\tilde{v}$ selected in this way is compared to the PER values of other groups of $\Lambda_l$, and a group, in which the ratio thereof exceeds a specific threshold value δw, is added to the set $\Gamma_i$, so that the set $\Gamma_i$ can be updated at step S403, and this operation can be represented by the following Equation 5:

$$\gamma = \{v \in \Lambda_l | PER_i^{GRP}(v)/PER_i^{GRP}(\tilde{v}) > \delta_w\}$$

$$\Gamma_i \leftarrow \Gamma_i \cup \gamma \quad \text{[Equation 5]}$$

In this case, when it is assumed that FS interference is present in the group $\tilde{v}$, the PER values of groups $\tilde{v}\pm 1$ adjacent to the group $\tilde{v}$ exceed the required PER $\widehat{PER}$ due to the overlapping characteristics of FS interference signals although FS interference is not present and may be then added to the set $\Lambda_l$. Therefore, in order to prevent these groups from being included in $\delta_i$, a threshold value δw can be set to the ratio of the error rate probability $P_i^{GRP}(\tilde{v})$ of the group $\tilde{v}$ to the error rate probability $P_i^{GRP}(\tilde{v}\pm 1)$ of the groups $\tilde{v}\pm 1$, as given by the following Equation 6:

$$\delta_w = \frac{p_i^{GRP}(\tilde{v}\pm 1)}{p_i^{GRP}(\tilde{v})} = \frac{((1-(1-p_i^N)(1-p_i^{FS}))(W-w) + p_i^N w)/W}{1-(1-p_i^N)(1-p_i^{FS})} \quad \text{[Equation 6]}$$

where $P_i^N$ may denote the error rate probability of the FHSS system i caused by channel noise and $P_i^{FS}$ may denote the error rate probability of the FHSS system i caused by FS interference. In this case, since $P_i^{FS}$ is much greater than $P_i^N$ ($P_i^{FS} \gg P_i^N$) the threshold value δw can be approximated as given by the following Equation 7:

$$\delta_w = \frac{1}{W} \cdot \frac{((p_i^{FS}(1-p_i^N) + p_i^N)(W-w) + p_i^N w)}{p_i^{FS}(1-p_i^N) + p_i^N} = \frac{W-w}{W} \quad \text{[Equation 7]}$$

Thereafter, in the case where a set of groups which do not overlap the group $\tilde{v}$, among the groups of $\Lambda_l$, is assumed to be $\Lambda_{l+1}$, if $\Lambda_{l-1} \neq \phi$, a value of l is increased by 1, and the previous procedure is repeated, whereas if $\Lambda_{l+1}=\phi$, the set $\Gamma_i$ of the groups in which FS interference is present can be fixed or estimated.

In this way, the present invention can perform group-based classification and reduce the time required to classify channels by about ⌊W/d⌋ compared to the conventional technique, thus more rapidly avoiding or canceling FS interference.

Next, the present invention may perform a closed-loop power control technique to reduce the PER caused by channel noise. That is, since channel noise is uniformly distributed across all the bands, it cannot be mitigated using an FH technique which excludes a specific band from a set of FH channels. Accordingly, the present invention can mitigate the influence of channel noise in the FH channels using the closed-loop power control technique in consideration of the characteristics of channel noise. This will be described in detail with reference to FIG. 5.

Figure 5:
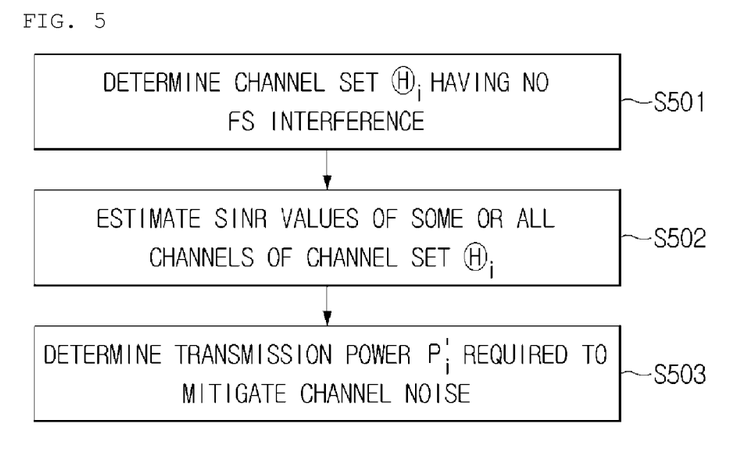
FIG. 5 is a flowchart illustrating a procedure for determining transmission power according to a first embodiment of the present invention.

FIG. 5 is a diagram illustrating a procedure for determining transmission power according to a first embodiment of the present invention.

As shown in FIG. 5, the present invention can adjust transmission power in consideration of only channel noise and FD interference, included in a set $\Theta_i$ of FH channels through which packets are to be transmitted, so as to minimize power consumption, unlike the conventional power control technique which determines transmission power in consideration of all of the interference and noise present in all the bands.

First, the FHSS system may exclude channels of the FHSS system belonging to all groups of the set $\Gamma_i$ from the FH channel set, and then determine a new FH channel set $\Theta_i$, as given by the following Equation 8 at step S501, $$\Theta_i = \{m | m \in \Omega - \Psi_x\} \quad \text{[Equation 8]}$$

where x may denote the index of each group included in the set $\Gamma_i$.

The intersection of the non-overlapping FH channel set $\Theta_r^F$, in the above Equation 2 and the new FH channel set $\Theta_i$ in Equation 8 may be defined as $\tilde{\Theta}_i (\subseteq \Theta_i)$, as given by the following Equation 9:

$$\tilde{\Theta}_i = \Theta_r^F \cap \Theta_i = \{m | m \in \Theta_r^F - \Psi_x\} \quad \text{[Equation 9]}$$

where x may denote the index of each group included in the set $\Gamma_i$.

The FHSS system may estimate the SINR values of the packets transmitted through some or all channels of the channel set $\Theta_i$, that is, channels of the set $\tilde{\Theta}_i$, at step S502, and may update the estimated SINR value at predetermined periods of $T_L$. Further, the FHSS system can determine or adjust transmission power using the SINR value fed back in this way, as given by the following Equation 10 at step S503, $$P_i' = \frac{\hat{\gamma}_i}{\frac{1}{c(\tilde{\Theta}_i)}\sum_{j=1}^{c(\tilde{\Theta}_i)} \gamma_i(j)} P_i \quad \text{[Equation 10]}$$

where $P_i$ may denote the current transmission power of the FHSS system i, $\gamma_i(j)$ may denote the SINR of a j-th channel included in the set $\tilde{\Theta}_i$ of the FHSS system i, and $\hat{\gamma}_i$ may denote the required SINR of the FHSS system i.

In this case, $\hat{\gamma}_i$ for the required PER $\widehat{PER}$ can be determined by the following Equation 11.

$$\hat{\gamma}_i = -2\ln\left(2 - 2(1 - \widehat{PER})^{\frac{1}{n_{bits}}}\right) \quad \text{[Equation 11]}$$

where $n_{bits}$ may denote the number of bits of each transmitted packet.

As described above, unlike the conventional power control technique which determines transmission power in consideration of all interference and channel noise present in all the bands, the present invention excludes FS interference from FH channels using the results of channel classification based on the AFH technique and determines transmission power in consideration of only channel noise and FD interference included in FH channels through which packets are to be transmitted, thus further decreasing power consumption.

Finally, the present invention can classify channels of the FH channel set $\Theta_i$ on the basis of the channels of the FHSS system and can avoid FD interference in consideration of the spectral characteristics of FD interference signals having a narrower frequency band than that of FS interference signals, and this operation will be described with reference to FIG. 6.

Figure 6:
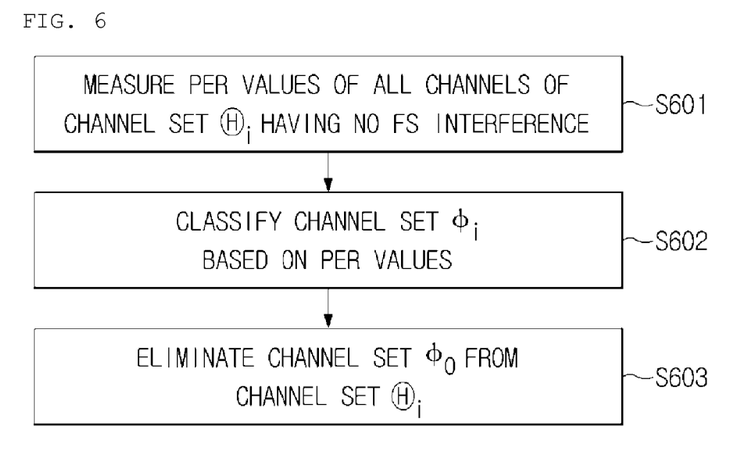
FIG. 6 is a flowchart illustrating a procedure for canceling FD interference according to a first embodiment of the present invention.

FIG. 6 is a flowchart illustrating a procedure for avoiding FD interference according to a first embodiment of the present invention.

As shown in FIG. 6, when the number of packet types of the FHSS system is K, for example, K=3 such as DH1, DH3 and DH5 of Bluetooth, the effective data rate (goodput) of the FHSS system, which is defined as the ratio of the transmission time of packets that were transmitted to the data transmission time of packets that were successfully received, can be represented by the following Equation 12.

$$R = \sum_{m=0}^{M-1} \frac{\sum_{l=1}^{K} \hat{T}_{\Phi_l} \hat{p}_{\Phi_l}(m)}{\sum_{l=1}^{K} T_l \hat{p}_{\Phi_l}(m)} \quad \text{[Equation 12]}$$

where l may denote a packet having an l-th longest length among the packets of the FHSS system, $T_l$ may denote the entire transmission time of the packet l, $\hat{T}_{\Phi_l}$ may denote the data transmission time of the packet l, $\hat{p}_{\Phi_l}(m)$ may denote the probability that at least one of all FHSS systems located within a communication coverage will transmit the packet l through a channel m, and $\hat{p}_{\Phi_l}(m)$ may denote the probability that the packet l transmitted through the channel m will be successfully transmitted.

This procedure will be described below. In order to improve the goodput of the FHSS system while efficiently avoiding FD interference, the present invention may classify FH channels into K+1 sets $\Phi_l$ (l=0, . . . , K) depending on the PER values of respective channels, unlike the conventional techniques which divide FH channel sets into a bad channel set in which interference is present and a good channel set in which interference is not present. In this case, $\Phi_0$ may denote a set of channels excluded from the FH channel sets, $\Phi_1$ may denote a set of channels through which a single slot packet, for example, DH1 of Bluetooth, is transmitted, $\Phi_2$ may denote a set of channels through which a packet having the second longest length among multi-slot packets defined in the FHSS system, for example, DH3 of Bluetooth, is transmitted, and $\Phi_3$ may denote a set of channels through which a packet having the third longest length among the multi-slot packets defined in the FHSS system, for example, DH5 of Bluetooth, is transmitted.

As shown in the above Equation 12, as the probability that packets having longer length will be successfully transmitted increases, the goodput of the entire system also increases. Accordingly, the present invention measures the PER values of all channels included in the channel set $\Theta_i$ at step S601, compares a specific threshold value with the PER values of the respective channels, as given by the following Equation 13, and then classifies the FH channels into K+1 sets $\Phi_l$ (l=0, . . . , K) at step S602. Further, the present invention adjusts the lengths of packets in conformity with the states of the respective channels and transmits the length-adjusted packets, thus increasing goodput.

$$\Phi_0 = \{m \in \Phi_1 | PER_i^{\Phi_1}(m) \geq \delta_B\}$$

$$\Phi_1 = \{m \in \Phi_1 | \delta_G \leq PER_i^{\Phi_1}(m) < \delta_B\} \cup \{m \in \Phi_2 | PER_i^{\Phi_2}(m) \geq \delta_B\}$$

$$\Phi_x = \{m \in \Phi_{x-1} | PER_i^{\Phi_{x-1}}(m) < \delta_G\} \cup \{m \in \Phi_x | \delta_G \leq PER_i^{\Phi_x}(m) < \delta_B\} \cup \{m \in \Phi_{x+1} | PER_i^{\Phi_{x+1}}(m) \leq \delta_B\}$$

$$\Phi_K = \{m \in \Phi_{K-1} | PER_i^{\Phi_{K-1}}(m) < \delta_G\} \cup \{m \in \Phi_K | PER_i^{\Phi_K}(m) < \delta_B\} \quad \text{[Equation 13]}$$

In Equation 13, x=2, . . . , K−1, $PER_i^{\Phi_x}(m)$ may denote the PER of a channel m in the set $\Phi_x$ of the FHSS system i, and $\delta_S$ and $\delta_G$ ($\leq \delta_B$) may denote a PER threshold value for channel classification.

If $PER_i^{\Phi_x}(m)$ of the packet that is transmitted through the channel m in the set $\Phi_x$ is greater than $\delta_E$, the channel m is transferred to the set $\Phi_{x-1}$, whereas if $PER_i^{\Phi_x}(m)$ is less than the threshold value $\delta_B$, the channel m may be transferred to the set $\Phi_{x+1}$. The transmission unit of the FHSS system classifies the channels of the FH channel set $\Theta_i$, as given by the above Equation 13, and updates the FH channel set $\Theta_i$ at each period $T_S (\leq T_L)$, as given by the following Equation 14, in such a way as to eliminate the set $\Phi_0$ of channels which have PER values equal to or greater than the specific threshold value and through which packets cannot be transmitted, thus cancelling FD interference at step S603.

$$\Theta_i = \{m | m \in \Theta_i - \Phi_0\} \quad \text{[Equation 14]}$$

In this way, since the present invention adjusts the lengths of packets depending on the PER values of respective channels and stably transmits packets, better goodput than that of the conventional techniques can be obtained. Further, the present invention eliminates the set of channels, classified as channels through which packets cannot be transmitted, from those FH channel sets in which channels of the group having FS interference were eliminated, thus cancelling FD interference.

The FHSS system according to the present invention may gradually increase the probability of being influenced by co-channel interference as the number of FH channels decreases, that is, as the number of channels excluded from the FH channel set $\Theta_i$ or the number of channels included in the set $\Phi_0$ increases, due to the characteristics of the FH system. Therefore, in order to reset the channel set $\Phi_0$ excluded from the FH channels and suitably reflect variations in the environment of FS interference, the present invention adjusts the period $T_L$ as given by the following Equation 15 according to the number of channels of the FH channel set $\Theta_i$ and the ratio $\zeta(=c(\Phi_0)/c(\Theta_i))$ of the number of channels excluded from the FH channels to the total number of the FH channels, where $c(\Phi_0)$ may denote the number of elements in the set $\Phi_0$, $$T_L = \begin{cases} T_{min}, & c(\Theta_i) < 15 \text{ or } \zeta \geq \delta \\ 2T_L, & c(\Theta_i) \geq 15 \text{ and } \zeta < \delta \end{cases} \quad \text{[Equation 15]}$$

where $T_{min}$ may denote the minimum transmission period of the period $T_L$.

Hereinafter, the apparatus and method for avoiding interference noise in the FHSS system according to a second embodiment of the present invention will be described in detail with reference to FIGS. 7 to 12.

Figure 7:
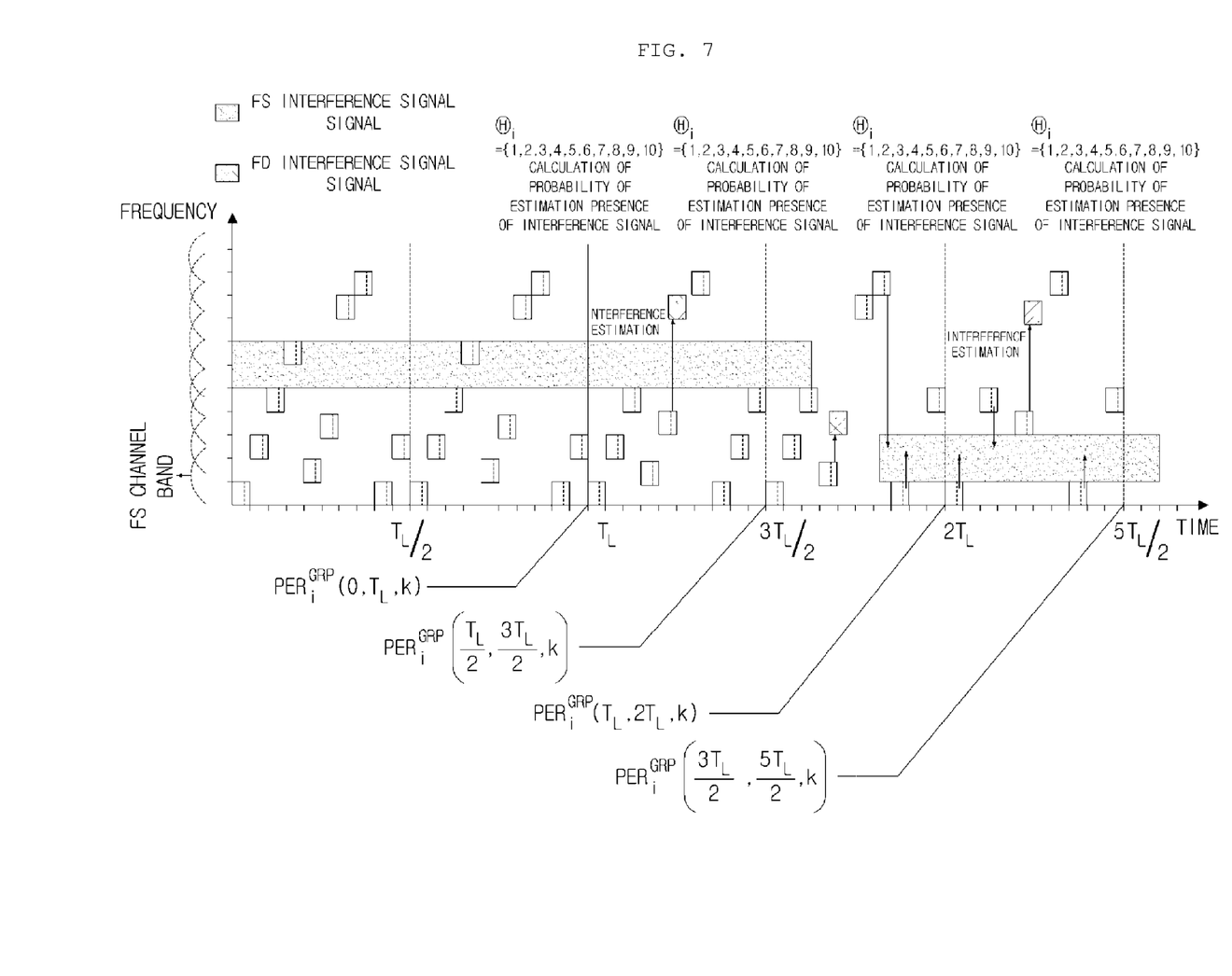
FIG. 7 is a diagram illustrating the schematic construction of an FHSS system according to a second embodiment of the present invention.

FIG. 7 is a diagram illustrating the schematic construction of the FHSS system according to a second embodiment of the present invention.

A procedure for classifying candidate frequency groups in which FS interference may be present according to a second embodiment of the present invention will be described with reference to FIG. 7. In particular, the present invention can group the channels of the FHSS system using two methods so as to rapidly avoid FS interference channels.

That is, the methods are classified into a method of dividing the channels of the FHSS system into K frequency groups which correspond to the number of locations and bandwidths of K FS interference signals, as shown in Equation 1, and a method of simply dividing the channels of the FHSS system into U ($\leq K$) frequency groups on the basis of the bandwidths of FS interference signals without regard to the overlapping characteristics of the FS interference signals. In this case, the set of channels of the FHSS system included in the frequency group k can be represented by the following Equation 16:

$$\Psi_k' = \{m \in \Omega \mid Wk \leq m < W(k+1); k=0,1,\ldots,U-1\} \quad \text{[Equation 16]}$$

where W may denote a number of the channels of the FHSS system included in the bandwidth of each FS channel.

In this case, as shown in FIG. 7, the present invention can perform channel classification depending on the PER values of the respective frequency groups in a range from the time $t_s = nT_L/2$ to the time $t_f = t_s + T_L$. In this case, $T_L$ denotes the period during which classification is performed. It is assumed that PER values for the frequency channel j of the FHSS system i in the range from time $t_s$ to time $t_f$ are assumed to be $PER_i(t_s, t_f, j)$.

First, when the channels of the FHSS system are divided, as given by Equation 1, the PER values for the frequency group k of the FHSS system i can be obtained by the following Equation 17.

$$PER_i^{GRP}(t_s, t_f, k) = \frac{\sum_{j=wk}^{wk+W-1} PER_i(t_s, t_f, j)}{W} \quad \text{[Equation 16]}$$

Meanwhile, when the channels of the FHSS system are divided as given by Equation 16, PER values for the frequency group k of the FHSS system i can be obtained by the following Equation 18.

$$PER_i^{GRP}(t_s, t_f, k) = \frac{\sum_{j=Wk}^{W(k+1)-1} PER_i(t_s, t_f, j)}{W} \quad \text{[Equation 18]}$$

Based on this equation, the set $\Lambda_i$ of candidate frequency groups having the probability of FS interference signals being present can be represented by the following Equation 19:

$$\Lambda_i = \{k \mid PER_i^{GRP}(t_s, t_f, k) \geq \lambda\} \quad \text{[Equation 19]}$$

where $\lambda$ denotes a threshold value required to identify a channel in which an interference signal is present.

In the case where all channels in the candidate frequency groups are excluded from the FH channels, if the bandwidths of the FS interference channels overlap one another, even channels in which FS interference signals are not actually present may be excluded from the FH channels. Therefore, in order to prevent the occurrence of such an erroneous operation, the present invention detects only frequency channels, in which FS interference signals are actually present, using a filtering technique.

The present invention can estimate channels in which FS interference is actually present in consideration of the case where FS interference channels overlap one another, and this procedure will be described with reference to FIG. 8.

Figure 8:
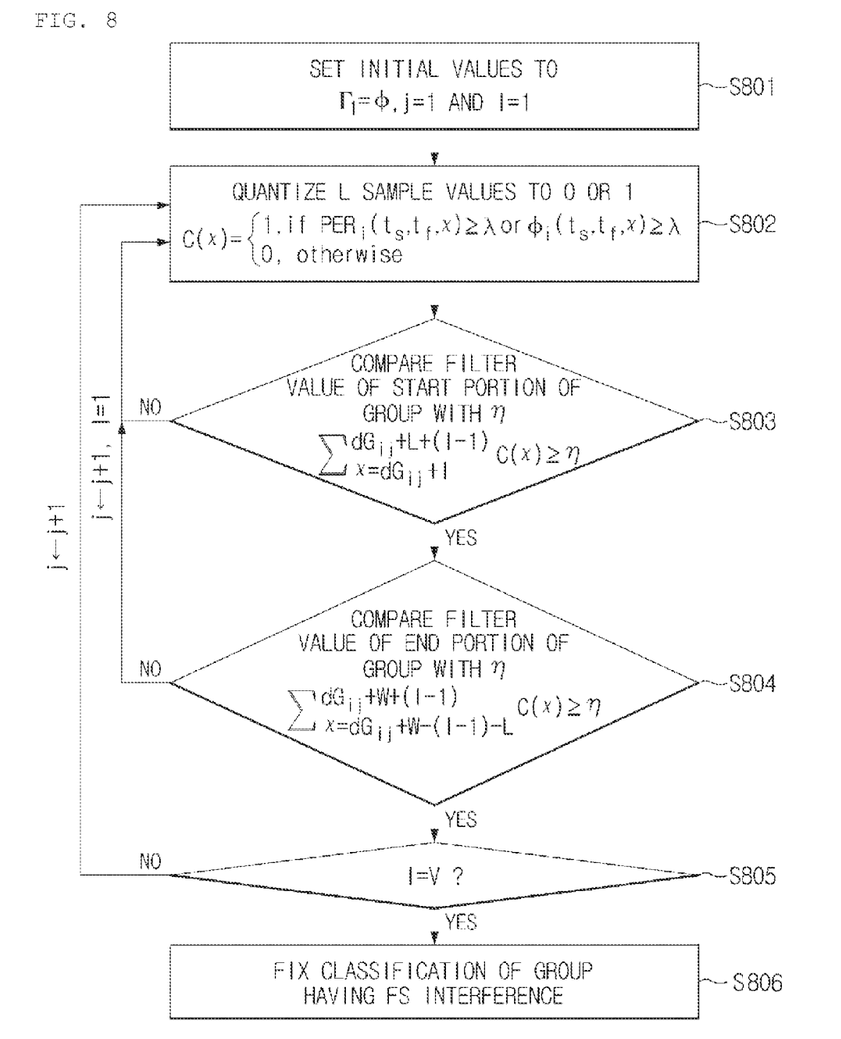
FIG. 8 is a flowchart illustrating a procedure for estimating a group in which FS interference is actually present according to a second embodiment of the present invention.

FIG. 8 is a flowchart illustrating a procedure for classifying frequency groups in which FS interference is actually present according to a second embodiment of the present invention.

As shown in FIG. 8, it is assumed that the index of a j-th frequency group in a set $\Lambda_i$ of candidate frequency groups having a possibility of there being FS interference signals is defined as $G_{i,j}(0 \leq G_{i,j} \leq |\Lambda_i|)$, and the number of samples that are applied to detection is defined as L ($<d$). $|\Lambda_i|$ denotes the number of frequency groups included in the set $\Lambda_i$.

First, the case where the channels of the FHSS system are divided into a number of groups which correspond to the number of locations and bandwidths of FS interference signals as in the above Equation 1 is considered.

The transmission unit sets initial values to j=0, l=0, and $\Gamma_i = \phi$ at step S801. In this case, when a non-linear filter such as a median filter is used as an example of the present invention, L+V sample values in the frequency group $G_{i,j}$ quantized to 0 or 1 as given by the following Equation 20, at step S802, in order to reduce the complexity of mounting. At step S803, the sum of L quantized samples is compared to a threshold value $\eta$, so that it is determined whether FS interference signals are present in the first L channels included in a relevant FS signal frequency band.

$$C(x) = \begin{cases} 1, & \text{if } PER_i(t_s, t_f, x) \geq \lambda \text{ for } dG_{i,j} \leq x \leq dG_{i,j} + \\ & (L+V); 0 \leq G_{i,j} \leq |\Lambda_i| \\ 0, & \text{otherwise} \end{cases} \quad \text{[Equation 20]}$$

In Equation 20, C(x) denotes the quantized value of $PER_i(t_s, t_f, x)$, and V denotes the number of times required to verify whether FS interference signals are present.

When $\Sigma_{x=dG_{i,j}+1}^{dG_{i,j}+L+(l-1)} C(x) < \eta$ is satisfied at step S803, it is determined that FS interference signals are not present in the first d channels of the frequency group $G_{i,j}$, the value j is increased by 1, and thereafter the process returns to step S802 so that the same procedure is repeated for a subsequent FS interference channel.

In contrast, when the filter value of a start portion of the group is greater than $\eta$ at step S803 (that is, $$\left(\text{that is, } \sum_{x=dG_{i,j}+l}^{dG_{i,j}+L+(l-1)} C(x) \geq \eta\right),$$

the group has FS interference signals, and thus the filter values of the latter L channels of the relevant frequency group are compared to $\eta$ at step S804. When these filter values are greater than $\eta$, the value l is increased by 1, and thereafter the same procedure is repeated until l=(V−1) is satisfied in order to verify whether FS interference signals are present. When the filter values are less than $\eta$, it is determined that FS interference signals are not present in the frequency group $G_{i,j}$, the value j is increased by 1, and thereafter the process returns to step S802 so that the same procedure is repeated for a subsequent FS interference channel. When filter values for all l values falling within the range 0≤l≤(V−1) are greater than $\eta$, it is determined that FS interference signals are present in the frequency group $G_{i,j}$, and the set i of frequency channels in which FS interference signals are actually present may be updated, as given by the following Equation 21, at step S806. Through the above procedure, available channels can be maximally and efficiently acquired even if a plurality of FS interference signals is present.

$$\Gamma_i \leftarrow \Gamma_i \cup \{m \in \Omega | dG_{i,j} \leq m < dG_{i,j}+W; 0 \leq G_{i,j} \leq |\Lambda_i|\} \quad \text{[Equation 21]}$$

In this case, the transmission unit of each FHSS system excludes all frequency channels of the FHSS system included in the set $\Gamma_i$ from a set of FH available channels, and determines a new channel set $\Theta_i$, as given by the following Equation 22:

$$\Theta_i = \{m | m \in \Omega - \Gamma_i\} \quad \text{[Equation 22]}$$

Next, the case where the channels of the FHSS system are simply divided on the basis of only the bandwidths of FS interference signals without regard to the locations and overlapping characteristics of the FHSS interference signals as given by Equation 16 will be considered.

Similarly to the above procedure, when a non-linear filter such as a median filter is used as an example of the present invention, L+V sample values in an FS interference channel $k(\in F_{i,j})$, at least half of the channel band of which overlaps the channel band of the frequency group $G_{i,j}$, are quantized to 0 or 1, as given by the following Equation 23, so as to reduce the complexity of the mounting of the median filter. Then, the sum of L quantized samples is compared to the threshold value $\eta$, so that it is determined whether FS interference signals are present in first L channels included in a relevant FS signal frequency band.

$$C(x) = \begin{cases} 1, & \text{if } PER_i(t_s, t_f, x) \geq \lambda \text{ for } dk \leq x \leq dk + \\ & (L+V); k \in F_{i,j} \\ 0, & \text{otherwise} \end{cases} \quad \text{[Equation 23]}$$

In this case, $F_{i,j}$ denotes a set of FS interference channels, at least half of the channel band of which overlaps the channel band of the frequency group $G_{i,j}$, and can be represented by the following Equation 24.

$$\begin{cases} F_{i,j} = \left\{k \mid 0 \leq k < \dfrac{W/2}{d}\right\} \text{ for } G_{i,j} = 0 \\ F_{i,j} = \left\{k \mid \dfrac{(WG_{i,j}-W/2)}{d} \leq k < \dfrac{(WG_{i,j}+W/2)}{d}\right\} \text{ for } 1 \leq G_{i,j} \leq |\Lambda_i| \end{cases} \quad \text{[Equation 24]}$$

Similarly to the above filtering method, when filter values for all l values falling within the range 0≤l≤(V−1) are greater than $\eta$, it is determined that an FS interference signal is actually present in an FS interference channel k, and a set $\Gamma_i$ of frequency channels in which FS interference signals are present may be updated, as given by the following Equation 25:

$$\Gamma_i \leftarrow \Gamma_i \cup \{m \in \Omega | dk \leq m < dk+W; k \in F_{i,j}\} \quad \text{[Equation 25]}$$

As shown in Equation 24, FS interference channels, at least half of the signal band of which overlaps the signal band of the frequency group $G_{i,j}$, are only channels corresponding to 0<k<W/2d or $(WG_{i,j}-W/2)/d \leq k < (WG_{i,j}+W/2)/d$ among a total of K channels. Accordingly, there is an advantage in that when the channels of the FHSS system are divided as shown in the above Equation 16, the verification of whether actual FS interference signals are present needs to be performed only on a maximum of $(W/d)|\Lambda_i|$ FS signal channels among a total of K FS interference channels.

Finally, the present invention can avoid FD interference in consideration of the spectral characteristics of FD interference signals, and this procedure will be described with reference to FIG. 9.

Figure 9:
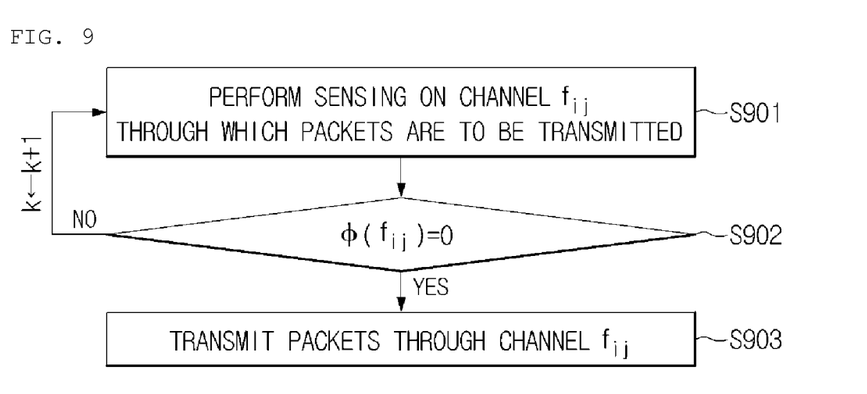
FIG. 9 is a flowchart illustrating a procedure for estimating the presence of an interference signal in an FH channel and transmitting packets only if interference is not present so as to avoid FD interference according to a second embodiment of the present invention.

FIG. 9 is a flowchart illustrating a procedure for estimating whether an interference signal is present in an FH channel and transmitting packets only if interference is not present in order to avoid FD interference according to a second embodiment of the present invention.

As shown in FIG. 9, the present invention instantaneously estimates whether an FD interference signal is present in a channel to be used for a subsequent FH when transmitting signals using an FH technique, and transmits packets only if the FD interference signal is not present, thus avoiding interference.

It is assumed that a j-th FH channel included in a set $\Theta_i$ of the FH channels of an FHSS system i is $f_{i,j}(\in \Theta_i)$.

In the present invention, the transmission unit of the FHSS system determines whether an interference signal is present in the channel $f_{i,j}$ by using a sensing technique such as a common energy detector or a Fourier transform detector before transmitting packets through the channel $f_{i,j}$ at step S901. When it is assumed that sensing is performed on the channel $f_{i,j}$ using, for example, an energy detector, the FHSS system determines whether interference is present in the channel $f_{i,j}$ by using a simple hypothesis test given in the following Equation 26:

$$H_0: r_{i,j}(n) = w(n)$$

$$H_1: r_{i,j}(n) = S_j(n) + w(n) \quad \text{[Equation 26]}$$

where $H_1$ and $H_0$ denote hypothetical situations indicating whether an interference signal is present, $S_j(n)$ denotes an interference signal transmitted through the channel $f_{i,j}$ at time $t=nT$, $r_{i,j}(n)$ denotes a reception signal which is received by the FHSS system i through the channel $f_{i,j}$ at time $t=nT$, $w(n)$ denotes Gaussian noise having a mean of 0 and a variance of $\sigma_w^2$, and T denotes the period during which the hypothesis test is performed.

In this case, the FHSS system i determines whether packets can be transmitted through the channel $f_{i,j}$ by the following Equation 27:

$$\varphi_i(f_{i,j}) = \begin{cases} 0, & y(f_{i,j}) < \lambda' \\ 1, & y(f_{i,j}) \geq \lambda' \end{cases} \quad \text{[Equation 27]}$$

where $\lambda'$ denotes a threshold value required to determine whether an interference signal is present, and $y(f_{i,j})$ denotes a value, indicative of the magnitude of the reception signal received through the channel $f_{i,j}$ when the energy detector is used, and can be obtained by the following Equation 28:

$$y(f_{i,j}) = \sum_{l=0}^{L'-1} |r_{i,j}(n-l)|^2 \quad \text{[Equation 28]}$$

where L' denotes the number of reception signal samples.

If it is determined at step S902 that an interference signal is not present in the channel $f_{i,j}$, that is, $\phi_i(f_{i,j})=0$, the transmission unit of the FHSS system i transmits packets through the channel $f_{i,j}$ step S903, whereas if it is determined that an interference signal is present in the channel $f_{i,j}$, that is, $\phi_i(f_{i,j})=1$, the transmission unit of the FHSS system i does not transmit packets through the channel $f_{i,j}$, increases the value j by 1, and returns to step S901 so that the same procedure is repeated for a subsequent FH channel $f_{i,j-1}$. Using the above procedure, FD interference signals in FH channels are avoided, so that the transmission performance of the FHSS system that can be obtained by the present invention can be represented by the following Equation 29:

$$R_{pro} = N_{FH} B[(1-p_I)(1-p_f)(1-q_w) + p_I(1-p_d)(1-q_I)]/2 \quad \text{[Equation 29]}$$

where $N_{FH}$ denotes the number of frequency hopping operations per second of the FHSS system (for example, 1600 times in the case of Bluetooth), B denotes the number of bits of each transmission packet (for example, 216 bits in the case of DH1 packet of Bluetooth), $q_w$, denotes the PER of the transmission packet caused by channel noise, $q_I$ denotes the PER of the transmission packet caused by the interference signal included in the FH channel, and $p_I$ denotes the probability that an interference signal will be present within a sensing period at step S901.

Here, $p_1$ in Equation 29 can be represented by the following Equation 30:

$$p_I = 1 - \left( \prod_{\substack{j=1 \\ j \neq i}}^{N} \left(1 - \frac{T_{CS} + S_{packet}}{S_{slot}(D_j+1)} \frac{1}{|\Theta_j|}\right)^2 \left(1 - \frac{AW}{M}\right) \right) \quad \text{[Equation 30]}$$

where $|\Theta_j|$ denotes the total number of channels in a set $\Theta_j$, $S_{slot}$ denotes the size of the slots of the FHSS system (for example, 625 μs in the case of Bluetooth), $D_j$ denotes the number of slots in each transmission packet of an FHSS system j, $T_{CS}$ denotes the time required for channel sensing, A denotes the number of FS interference signals present in the FH channel, and $S_{packet}$ denotes the size of the transmission packet of the FHSS system.

Further, $p_d$ and $p_f$ in Equation 29 denote detection probability and false alarm probability for interference, respectively, and can be represented by, for example, the following Equation 31 and Equation 32, respectively, in the case of the energy detector.

$$P_d = Q\left(\frac{\lambda' - L'\sigma_w^2(1+\gamma)}{\sigma_w^2 \sqrt{2L'(1+2\gamma)}}\right) \quad \text{[Equation 31]}$$

$$P_f = Q\left(\frac{\lambda' - L'\sigma_w^2}{\sqrt{2L'}\,\sigma_w^2}\right) \quad \text{[Equation 32]}$$

In Equations, Q(x) denotes the value of a Q function for a variable x, and γ denotes the Interference-to-Noise power Ratio (hereinafter referred to as "INR").

In this way, the method described in FIG. 9 instantaneously avoids interference signals in a subsequent frequency hopping channel, thus improving the PER performance of the FHSS system. However, FS interference signals that may subsequently appear again in the FH channel cause a problem related to the packet transmission delay of the FHSS system due to the characteristics of causing interference for a long period of time in a wide frequency band, thus deteriorating the transmission efficiency (throughput) of the FHSS system.

Therefore, in order to solve the problem related to packet transmission delay, the present invention continuously detects channels in which FS interference signals are present, on the basis of the FS interference signal detection method described in FIG. 8 by using the probability of estimating the presence of an interference signal as well as using PER values.

When it is assumed that the number of channel sensing operations for the frequency channel j of the FHSS system i during a time period ranging from time $t_s = nT_L/2$ to time $t_f = t_s + T_L$ is $C_i(t_s, t_f, j)$, and the number of detections of an interference signal in the frequency channel j of the FHSS system i is $D_i(t_s, t_f, j)$, the probability $\phi_i(t_s, t_f, j)$ of estimating the presence of the interference signal in the frequency channel j of the FHSS system i can be obtained by the following Equation 33.

$$\phi_i(t_s, t_f, j) = \frac{D_i(t_s, t_f, j)}{C_i(t_s, t_f, j)} \quad \text{[Equation 33]}$$

In this case, when the channels of the FHSS system are divided into K frequency groups which correspond to the number of locations and bandwidths of FS interference signals, the probability of estimating the presence of interference signals in the frequency group k of the FHSS system i can be obtained by the following Equation 34:

$$\phi_i^{GRP}(t_s, t_f, k) = \frac{\sum_{j=wk}^{wk+W-1} \phi_i(t_s, t_f, j)}{W} \quad \text{[Equation 34]}$$

Further, when the channels of the FHSS system are merely divided on the basis of the bandwidths of the FS interference signals without regard to the locations and overlapping characteristics of the FS interference signals, the probability of estimating the presence of interference signals in the frequency group k of the FHSS system i can be obtained by the following Equation 35:

$$\phi_i^{GRP}(t_s, t_f, k) = \frac{\sum_{j=Wk}^{W(k-1)-1} \phi_i(t_s, t_f, j)}{W} \quad \text{[Equation 35]}$$

In this case, the set $\Lambda_i$ of candidate frequency groups having the probability of FS interference signals being present can be represented by the following Equation 36 using both the PER values of frequency groups and the probability of estimating the presence of interference signals in the frequency groups.

$$\Lambda_i = \{k | \text{PER}_i^{GRP}(t_s, t_f, k) \geq \lambda\} \cup \{k | \phi_i^{GRP}(t_s, t_f, k) \geq \delta\} \quad \text{[Equation 36]}$$

In Equation 36, δ denotes a threshold value required to identify channels in which FS interference signals are present using the probability of estimating the presence of interference signals.

The present invention continuously detects channels in which FS interference signals are present by applying all frequency groups in the set $\Lambda_i$ to the FS interference signal detection method of FIG. 8, thus solving the problem of not detecting interference signals because of both a packet transmission delay problem and a hidden terminal problem which may be caused by the FS interference signals.

In the environment of the following Table 1, the performance of the second embodiment of the present invention was evaluated. A Bluetooth system was used as an FHSS system, and an IEEE 802.11g WLAN system was used as an FS interference source. Further, in order to compare the performance of the proposed technique, an existing adaptive frequency hopping technique was used. The results of the simulation are described with reference to FIGS. 10 and 11.

TABLE 1

| Parameter | Value |
| --- | --- |
| Bluetooth transmission power | 1 Mw |
| Distance between Bluetooth master and slave | 1 m |
| Distance from adjacent Bluetooth | 2 m |
| Distance from adjacent WLAN | 2 m |
| WLAN transmission power | 25 Mw |
| WLAN data rate ($R_{Data}$) | 11 Mbit/s |
| WLAN PLCP data rate ($R_{PLCP}$) | 1 Mbit/s |
| WLAN packet header ($B_{packet}$) | 224 bits |
| WLAN PLCP header ($B_{PLCP}$) | 192 bits |
| WLAN packet payload ($B_{payload}$) | 12000 bits |
| WLAN transmission load (μ) | 1.0 |
| Channel classification time interval of proposed technique ($T_L$) | 0.2 sec |
| Channel classification time interval of existing TG2 technique | 1 sec |
| Time interval during which packets are transmitted to entire band | 4 sec |

Figure 10:
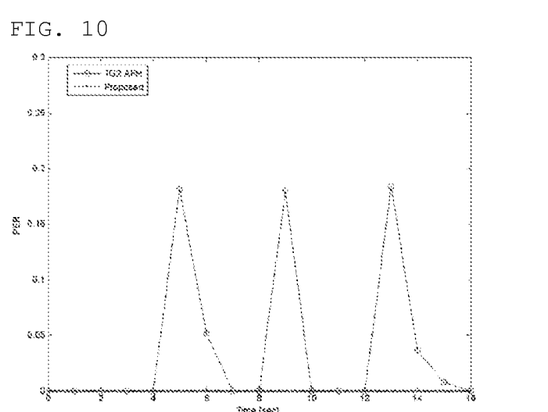
FIG. 10 is a diagram illustrating the PER performance of a proposed technique over time when a single FS interference signal is generated in any FS channel at 4-second intervals according to a second embodiment of the present invention.

FIG. 10 is a diagram illustrating the PER performance of the proposed technique over time when one FS interference signal is generated in any FS channel at 4-second intervals according to a second embodiment of the present invention.

As shown in FIG. 10, in the existing adaptive FH technique, PER performance is rapidly deteriorated when FS interference occurs due to the relatively slow estimation of FS interference, and the influence of FS interference persists for a predetermined period of time. In contrast, in the proposed technique, PER performance does not worsen even if FS interference occurs because the presence of interference signals is estimated for a subsequent frequency hopping channel when signals are transmitted using a frequency hopping technique, and packets are transmitted only if interference signals are not present.

Figure 11:
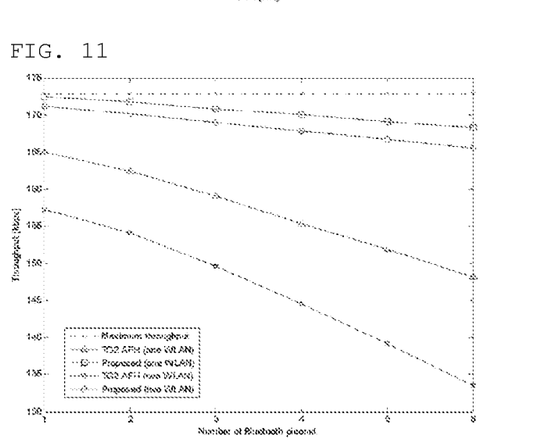
FIG. 11 is a diagram illustrating the transmission performance of the proposed technique depending on the number of FD interference signals when the number of WLAN interference signals is one or two according to a second embodiment of the present invention.

FIG. 11 is a diagram showing the transmission performance of the proposed technique depending on the number of FD interference signals when the number of WLAN interference signals is 1 or 2 according to a second embodiment of the present invention.

As shown in FIG. 11, the proposed technique estimates whether an interference signal is present in a subsequent frequency hopping (FH) channel when transmitting signals using an FH technique, and transmits packets only if an interference signal is not present, so that the probability of the packets colliding with the interference signal can be reduced, thus not only efficiently avoiding FS and FD interference, but also rapidly avoiding FS interference by classifying channels in consideration of the channel characteristics of FS interference signals and by precisely detecting FS interference channels based on filters. In contrast, in the case of the existing adaptive FH technique, when collision with other FD interference packets occurs, a relevant channel is excluded from FH channels, so that the probability of colliding with other FD interference packets instead gradually increases, and thus as the number of FD interference signals increases, transmission performance greatly decreases.

Figure 12:
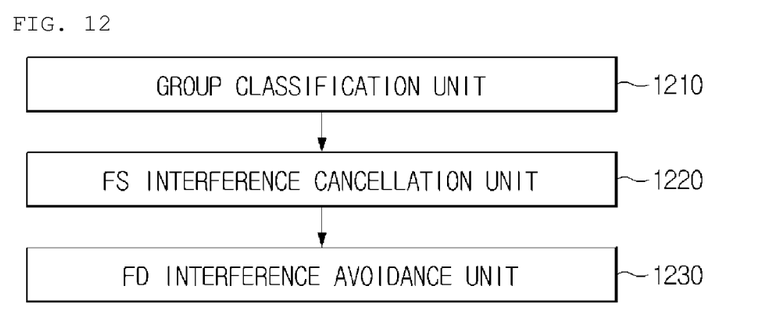
FIG. 12 is a diagram illustrating an apparatus for canceling channel interference according to an embodiment of the present invention.

FIG. 12 is a diagram illustrating an apparatus for cancelling channel interference according to an embodiment of the present invention.

As shown in FIG. 12, an apparatus for cancelling channel interference according to the present invention includes a group classification unit 1210, an FS interference cancellation unit 1220, an FD interference avoidance unit 1230, etc.

The group classification unit 1210 can classify all channels of the FHSS system into K groups depending on the channel characteristics of FS radio interference using a method 1) of classifying the channels of the FHSS system into K groups which correspond to the number of locations and bandwidths of FS interference signals at preset periods of $T_L$, according to a first embodiment, and a method 2) of classifying the channels of the FHSS system into U groups on the basis of the bandwidths of the FS interference signals according to a second embodiment.

The FS interference cancellation unit 1220 can eliminate a group, in which FS interference signals are present, from the K classified groups on the basis of the PER values of the K groups using a method 1) of comparing the PER values of the respective groups with a specific threshold value based on the PER values of the K groups and fixing a group in which FS interference is present based on the results of the comparison in such a way as to select a group having the highest PER from among the K groups, to compare the ratio of the PER of the selected group to the PER values of the remaining groups with the specific threshold value and to fix the group in which FS interference is present based on the results of the comparison, according to a first embodiment. Therefore, the FS interference cancellation unit 1220 excludes the group fixed as the group in which FS interference is present from the K classified groups, thus cancelling FS interference.

Further, the FS interference cancellation unit 1220 may use a method 2) of comparing the PER values of respective groups of the K classified groups with the specific threshold value based on the PER values, obtaining candidate frequency groups having a possibility of there being FS interference signals on the basis of the results of the comparison, fixing a set of frequency channels in which FS interference signals are actually present by applying a predetermined filter to the obtained candidate frequency groups, and then eliminating the group fixed as the group, in which the FS interference is present, from the K groups when the group in which FS interference is present is fixed, according to a second embodiment.

A channel noise cancellation unit can estimate the SINR of channels in which FS interference is not present, and can determine transmission power required to mitigate channel noise based on the estimated SINR.

The FD interference avoidance unit 1230 instantaneously detects whether an interference signal is present in a channel to be used for a subsequent FH using a predetermined detector when transmitting signals using the FH technique of the FHSS system through the channels in which FS interference is not present, and transmits packets only if FD interference is not present, on the basis of the results of the detection, thus avoiding the FD interference.

As described above, the present invention is a technique for differentiating channel classification methods depending on the spectral characteristics of FS interference, FD interference and channel noise and determining FH channels and transmission power, and is configured to classify the channels of the FHSS system into groups depending on the locations and bandwidths of channels of FS interference components, thus reducing the time required to avoid FS interference compared to conventional techniques. In addition, the present invention determines transmission power in consideration of only the noise of channels in which radio interference is not present, thus reducing power consumption, and also flexibly adjusts the lengths of packets that are transmitted through respective channels depending on the PER values of the channels, thus obtaining better goodput and PER performance than do conventional techniques.

The apparatus and method for avoiding interference noise in the FHSS system according to the present invention can be modified and applied in various forms without departing from the technical spirit of the present invention and are not limited to the above embodiments. Further, the embodiments and drawings are only intended to describe the contents of the present invention in detail, and are not intended to limit the technical scope of the invention. Since the above-described present invention can be replaced, modified and changed by those skilled in the art in various forms without departing from the technical scope of the present invention, the present invention is not limited by the embodiments and drawings, and should be interpreted as being included in the scope of the accompanying claims and equivalents thereof.

The invention claimed is:

1. A method of avoiding interference noise, comprising steps of:
classifying all channels of a Frequency Hopping Spread Spectrum (FHSS) system into a predetermined number of groups;
eliminating a group in which a significant frequency static (FS) interference is present from the predetermined number of groups based on Packet Error Rate (PER) values of respective ones of the predetermined number of groups; and
instantaneously detecting whether a frequency dynamic (FD) interference signal is present in a channel to be used for subsequent Frequency Hopping (FH) when transmitting packets through channels, in which the significant FS interference is not present, by using an FH technique, and transmitting the packets through only channels in which the FD interference signal is not present, thus avoiding interference,
wherein the classifying the channels of the FHSS system into the predetermined number of groups comprises:
classifying the channels of the FHSS system at preset periods of duration $T_L$ into K groups, which correspond to a number of locations and bandwidths of FS interference signals, and obtaining the K groups using the following equation:

$$\Psi_k = \{m \in \Omega | wk \le m < wk+W; k=0,1,2,\ldots,K-1\},$$

where $\Psi_k$ denotes a set of the channels of the FHSS system included in k-th group of the K groups, m denotes a channel index in a set of all of the channels of the FHSS system defined as $\Omega=\{0, 1, \ldots, m, \ldots, M-1\}$, M denotes a total number of channels of the FHSS system, W denotes a number of the channels of the FHSS system included in a bandwidth of an FS interference channel, and w denotes a number of the channels of the FHSS system included in a non-overlapping bandwidth between the FS interference channel and an adjacent FS interference channel.

2. The method according to claim 1, wherein the eliminating the group in which the significant FS interference is present comprises:
comparing respective PER values of the K groups with a specific threshold value based on the PER values of the K groups, and determining a group in which the significant FS interference is present, based on results of the comparison, and
when the group in which the significant FS interference is present is determined, eliminating the determined group from the K groups.

3. The method according to claim 1, wherein the eliminating the group in which the significant FS interference is present comprises:
selecting a group having a highest PER value from among the K groups, based on the PER values of the K groups,
comparing a ratio of a PER value of the selected group to PER values of remaining groups with a specific threshold value, and determining a group in which significant FS interference is present, based on results of the comparison, and
when the group in which the significant FS interference is present is determined, eliminating the determined group from the K groups.

4. The method according to claim 1, wherein transmitting the packets through only the channels in which the FD interference signal is not present includes:
instantaneously detecting, using a predetermined detector, whether the FD interference signal is present in a channel to be used for subsequent frequency hopping (FH) when transmitting signals using an FH technique of the FHSS system through the channels in which the significant FS interference is not present, and
transmitting the packets only if the FD interference signal is not present, based on results of the detection using the predetermined detector, thus avoiding the FD interference signal.

5. The method according to claim 1, further comprising:
after completing all of the steps of claim 1, detecting repeatedly the FS interference signals that occur again in FH channels using both PER values of the channels of the FHSS system and a probability of estimating presence of interference signals,
wherein the probability of estimating the presence of interference signals denotes a probability of estimating presence of interference signals for a frequency group k of an FHSS system i during a period ranging from time $t_s = nT_L/2$ to time $t_f = t_s + T_L$, and is obtained using the following Equation:

$$\phi_i^{GRP}(t_s, t_f, k) = \frac{\sum_{j=wk}^{wk+W-1} \phi_i(t_s, t_f, j)}{W}$$

wherein $\phi_i^{GRP}(t_s, t_f, k)$ denotes the probability of estimating presence of interference signals for the k-th group of the FHSS system i, and $\phi_i(t_s, t_f, j)$ denotes a probability of estimating the presence of the interference signal in j-th channel of the FHSS system i.

6. A method of avoiding interference noise, comprising steps of:
classifying all channels of a Frequency Hopping Spread Spectrum (FHSS) system into a predetermined number of groups;
eliminating a group in which a significant frequency static (FS) interference is present from the predetermined number of groups based on Packet Error Rate (PER) values of respective ones of the predetermined number of groups; and
instantaneously detecting whether a frequency dynamic (FD) interference signal is present in a channel to be used for subsequent Frequency Hopping (FH) when transmitting packets through channels, in which the significant FS interference is not present, by using an FH technique, and transmitting the packets through only channels in which the FD interference signal is not present, thus avoiding interference,
wherein the classifying the channels of the FHSS system into the predetermined number of groups comprises:
classifying the channels of the FHSS system into U groups based on bandwidths of FS interference signals, and obtaining the U groups using the following equation:

$$\Psi_k' = \{m \in \Omega | Wk \leq m < W(k+1); k=0,1,\ldots,U-1\}$$

where $\Psi_k'$ denotes a set of the channels of the FHSS system included in k-th group of the U groups, m denotes a channel index in a set of all of the channels of the FHSS system defined as $\Omega = \{0, 1, \ldots, m, \ldots, M-1\}$, M denotes a total number of channels of the FHSS system, and W denotes a number of the channels of the FHSS system included in a bandwidth of an FS interference channel.

7. The method according to claim 6, wherein the eliminating the group in which the significant FS interference is present comprises:
comparing respective PER values of the U groups with a specific threshold value based on the PER values of the U groups, and obtaining candidate frequency groups having a possibility of FS interference signals being present, based on results of the comparison,
quantizing PER values of respective channels included in the candidate channel groups, filtering the quantized PER values using a predetermined filter, and then determining a set of frequency channels in which FS interference signals are actually present.

* * * * *